United States Patent

Pinsley et al.

[11] Patent Number: 6,070,145
[45] Date of Patent: May 30, 2000

[54] RESPONDENT SELECTION METHOD FOR NETWORK-BASED SURVEY

[75] Inventors: David B. Pinsley, Great Neck; Steven R. Coffey, East Hampton, both of N.Y.

[73] Assignee: The NPD Group, Inc., Port Washington, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/679,013

[22] Filed: Jul. 12, 1996

[51] Int. Cl.[7] .................................................... G06F 17/00
[52] U.S. Cl. ............................................ 705/10; 705/14
[58] Field of Search ......................................... 705/10, 14

[56] References Cited

U.S. PATENT DOCUMENTS

| | | | |
|---|---|---|---|
| 5,227,874 | 7/1993 | Von Kohorn | 358/84 |
| 5,566,291 | 10/1996 | Boulton | 395/161 |
| 5,675,510 | 10/1997 | Coffey | 364/514 |
| 5,710,887 | 1/1998 | Chelliah | 395/226 |
| 5,717,860 | 2/1998 | Graber | 395/200.12 |
| 5,740,035 | 4/1998 | Cohen et al. | 705/10 |
| 5,749,075 | 5/1998 | Toader | 705/14 |
| 5,806,043 | 9/1998 | Toader | 705/14 |

OTHER PUBLICATIONS

Pitkow, James and Recker Mimi, Results from the First World–Wide Web Survey, Computer Networks and ISDN Systems,1994.

O'Hearen, "Pre–Paid Calling Cards, Riinging up Big Incentive Sales", Incentive Marketting, Nov. 1995.

Gjestland, Leif, Net? Not Yet, Marketting Research, vol. 8 No. 1, 1996.

Interactive Technologies and Market Research, IAC Newsletter Collection, Conference Publication, May 1996.

Schultz, Keith, A Sentry for More than Just NetWare, PC Magazine, v14, n3 pNE47(1), Feb. 1994.

Booker, Ellis, Anthes, Garry H., and Betts, Mitch, Users Want infromation over entertainment, Computerworld, Oct. 1994.

*Primary Examiner*—Allen R. MacDonald
*Assistant Examiner*—Jagdish Patel

[57] ABSTRACT

The method for conducting a survey of users of an information document site located on a computer network includes embedding computer program instructions into an information document located at the site, where the instructions invoke a survey program, launching the survey program when a user accesses the information document, and activating the survey according to offering criteria based upon either a random or systematic participant selection. The method selects a survey participant from the users of the information document and then offers the participant an opportunity to access the survey by presenting the survey to the participant.

15 Claims, 4 Drawing Sheets

FIG. 4

Netscape - [Your Opinion Counts]
File Edit View Go Bookmarks Options Directory Window Help
Location: http://mis.npd.com/web/NthTest/recruit.html Your opinions will help us build a better site!

Please take a few moments to answer the following questions. In return for your input we'll enter your name into a drawing for a chance to win a Pentium PC.

1. In the last 30 days, how many time have you visited this site?

○ Less than 5 times   ○ Between 5 and 10 times   ○ More than 10 times

2. On a scale of 1 to 5 ( 1=poor, 5=excellent) How would you rate the following attributes of this site?

Current quality   ○1  ○2  ○3  ○4  ○5
   Access speed     ○1  ○2  ○3  ○4  ○5
   Visual appeal    ○1  ○2  ○3  ○4  ○5
   Ease of use      ○1  ○2  ○3  ○4  ○5

3. Please enter your e-mail address so we may contact you if you win the grand prize.

[                    ]

Thank you for your valuable opinions   [Submit]

Document Done

RESPONDENT SELECTION METHOD FOR NETWORK-BASED SURVEY

BACKGROUND OF THE INVENTION

1. Field of the Invention

This invention relates to a system for administering a survey or questionnaire to a sample of users of a computer network and, more particularly, a system for administering a survey for Internet Web site visitors.

2. Description of the Related Technology

The popularity of personal computers has exploded in the past decade. Each year more and more people have used more and more personal computers in more and more ways. This rapid expansion in computer use has resulted in the formation of on-line market places with products and services being advertised over networks such as the Internet and on networked computers of the World Wide Web. Such computers are known as Web sites. All types of products and services are marketed, promoted and/or sold, including motion pictures, television shows and automobiles. These Web sites not only have pictures and text, but may also include audio or video information available to the user or "surfer."

World Wide Web sites are built for many different objectives, including advertising products and services to consumers, selling products and services directly to consumers and distributing corporate and government information. In order to maximize the effectiveness of these sites, the producers try to make their sites interactive, interesting, educational, entertaining, etc. One of the methods to gauge the effectiveness of these factors is to survey the visitors to these sites.

Each site on the World Wide Web is a construction of many different "pages," each written in HTML (hypertext markup language). The HTML page contains the text and formatting information for the page. An HTML document will typically have references to the location of graphic images rather than include the images directly in the document itself. The most common image format is known as GIF (graphics image format). When "visiting" a Web page or site, the consumer's or user's Web browser requests and fetches the HTML document from the Web. The browser recognizes the references to images and then retrieves the images. The browser then paints the screen with the images and text according to the formatting information.

Web site producers are very interested in the consumers that visit their Web sites. Some sites already use a survey mechanism, wherein a questionnaire is written into a Web page and some consumers choose to provide the requested information. This is only a "convenience" sample. The responding visitors are not representative of all the visitors to the site. Thus, this method is not practical for serious information gathering. Achieving a statistically significant sample, minimizing the self-selection bias, is a problem in surveying a Web population.

SUMMARY OF THE INVENTION

It is an object of this invention to provide a statistically significant sample of a Web visitor population with a survey, minimizing the self-selection bias.

It is another object of this invention to provide the sample by embedding in the Web site a reference to an executable graphic image that initiates a program at a surveyor's computer site.

It is another object of this invention to provide a survey system wherein the information obtained from the survey is processed and analyzed by the surveyor before delivery to the Web site producer.

According to the invention, the method for conducting a survey of users of an information document located on a computer network includes embedding instructions into an information document located at the site, where the instructions invoke a sample selection program, launching the sample selection program when a user accesses the information document, and targeting the user for selection according to offering criteria. Based upon the offering criteria, selected users are given an opportunity to access the survey by presenting a graphic stimulus to the participant. Responding to the graphic stimulus causes the actual survey to be fetched from the surveyor's site.

BRIEF DESCRIPTION OF THE DRAWINGS

FIG. 4 shows an example of the survey presented to the selected consumer.

DETAILED DESCRIPTION OF THE PREFERRED EMBODIMENTS

The alternative to convenience sampling is to systematically target a few users and then to persuade them to complete the survey. Targeting is performed by selecting users on the basis of a systematic and random process. A sample selection criteria may be constructed whereby, on average, every Nth visitor would be selected. Given a value of N, as defined by the offering criteria, a random number between 1 and N is generated. If the number generated is equal to N, then the user is selected. The user may be offered some incentive to respond, in the form of a plea for assistance, an outright promotional gift, a chance in a lottery for compensation, or some other enticement. The bias in the systematically chosen sample introduced by frequent site visitors having higher probability of being selected than less frequent visitors can be accounted for by asking frequency of use questions in the survey.

The advertiser's Web (1) may have an HTML document (2), which may be the home page, with a few additional lines of code. The added code should be in the form of a reference to an executable graphic image program (9) located at the surveyor's site (3). The program (9) may monitor how many times it has been referenced. The program will cause one of two possible images to be sent to the user based on predetermined criteria.

Figure 3:
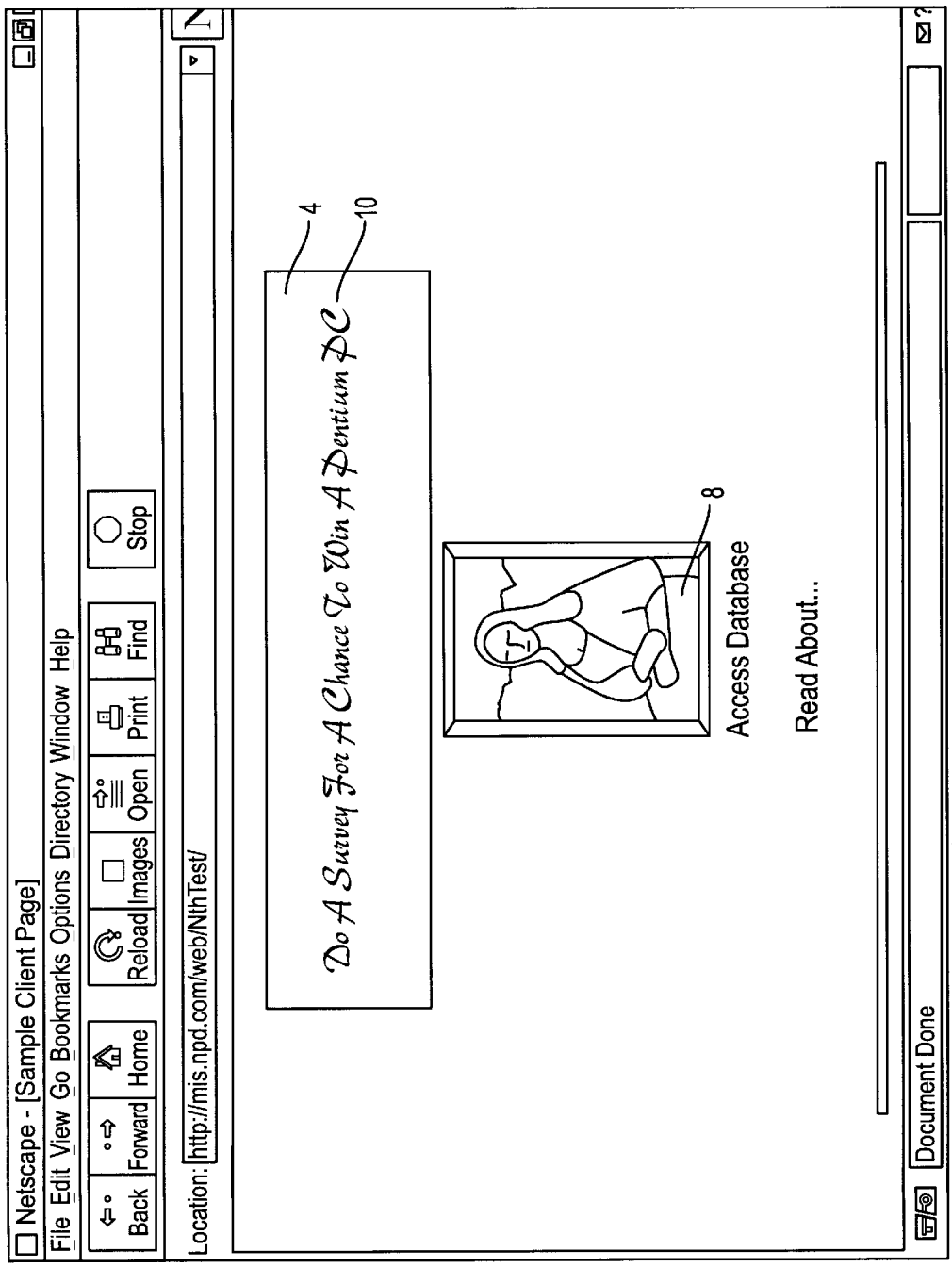
FIG. 3 shows an example of the large graphic image.

When a user (6) references the program by visiting the advertiser's (1) Web site, the program may output a large graphic image (4) shown in FIG. 3, enticing the consumer to click on it. If the selected consumer is persuaded by the enticements (10), and clicks on the image (4), the consumer is then presented with the survey as shown in FIG. 4. After the consumer completes the requested information (11), the consumer returns to the original advertiser's product or service information. The consumer can fully complete the survey or only partially complete the survey. If the selected consumer is not persuaded by the enticements (10) and chooses not to participate by selecting the advertiser's image (8), then the consumer bypasses the survey and proceeds directly to the advertiser's product or service information.

Figure 1:
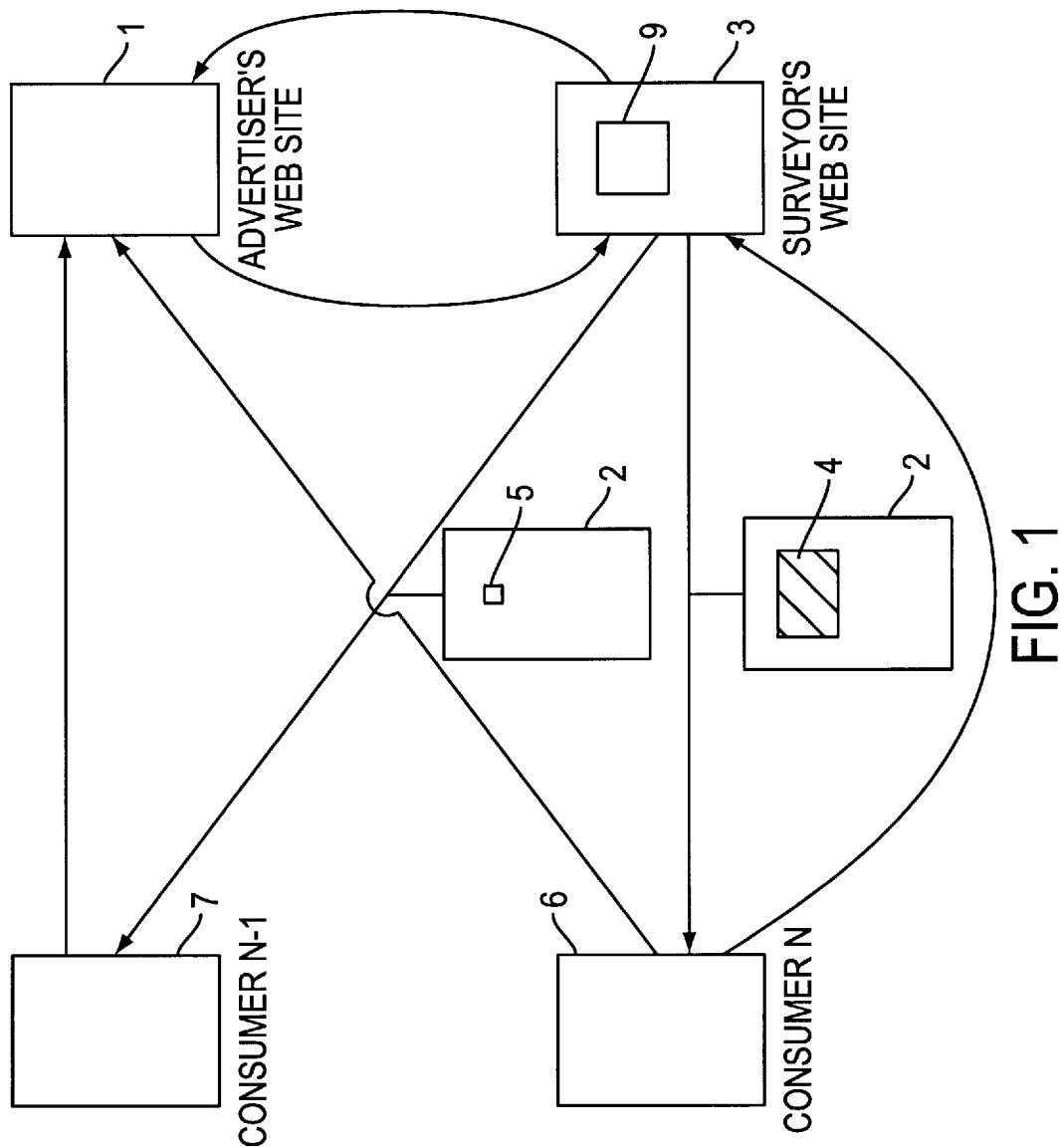
FIG. 1 shows a schematic of the inventive survey method.
Figure 2:
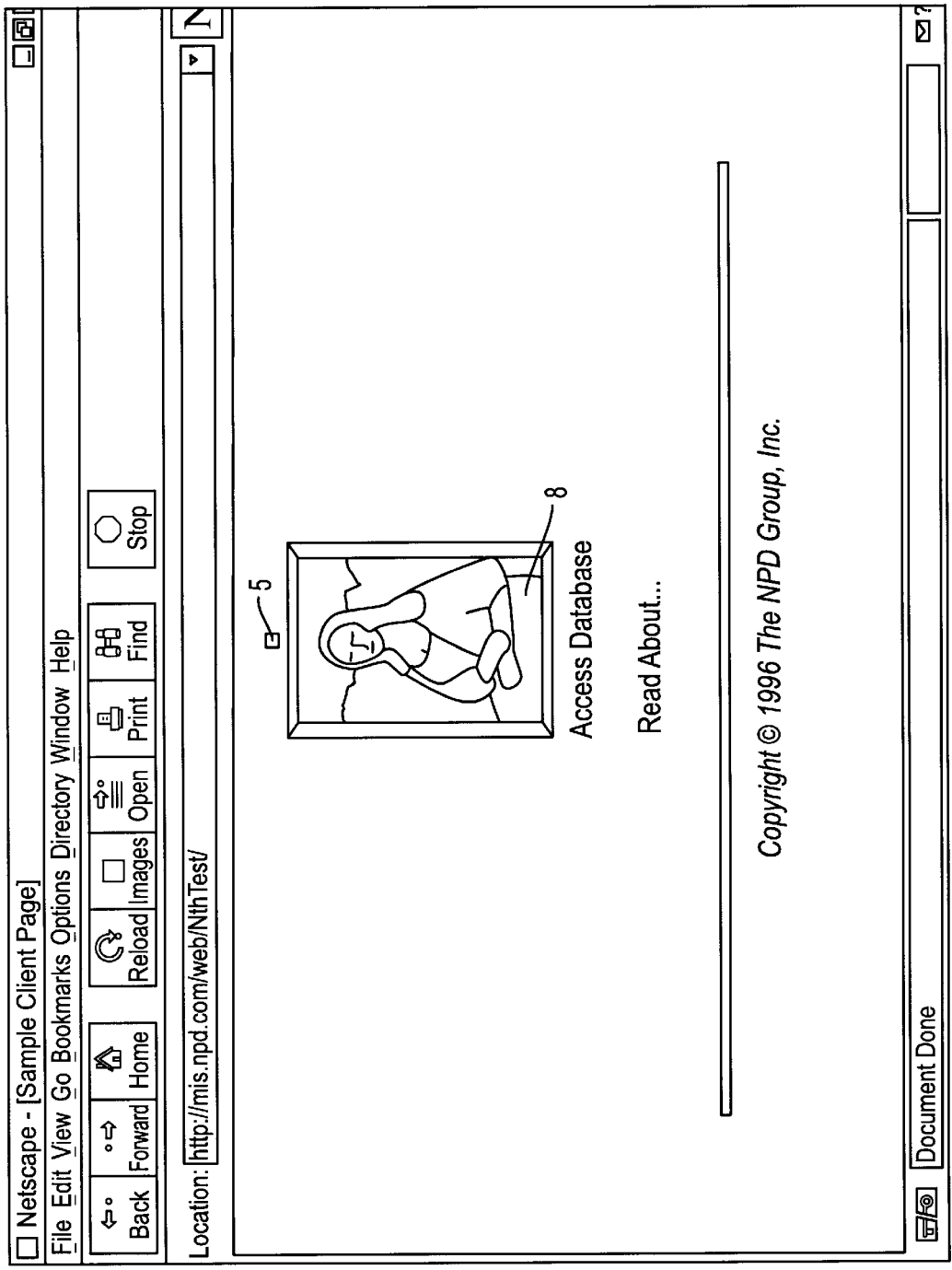
FIG. 2 shows an example of the small graphic image.

When a non-selected consumer (7) references the program, the program outputs a small graphic image (5) shown in FIG. 2. This image is preferably transparent and thus un-noticeable, but for application disclosure purposes is illustrated as image (5) represented by the small visible box. The non-selected consumer (7) may simply proceed, unaware of the survey system.

After the survey is completed, the information is collected, processed and analyzed by the surveyor (3), and then information may be delivered to the advertiser (1) or otherwise used.

The following is the HTML program for a sample from a systematically chosen group of consumers visiting the advertiser's Web page, this program is titled the Embedded Sampling GIF program; embedded references to the advertiser embedding into their HTML Web page a reference to the surveyor's program, Sampling refers to systematic algorithm of selecting, on average, every Nth consumer, and GIF for the graphic image format.

```
<html>
<!-- Sample Advertiser Page Implementing Nth Sampling
    Technique -->
<!-- Author: David Pinsley, The NPD Group -->
<!-- Last Modified: DD/MM/YYYY -->
<head><title>Sample Advertiser Page</title></head>
<body background="images/default.gif>
<!-- Beginning of Modification to Advertiser's page. -->
<!-- Advertiser adds these lines to their page, suggested
    before the first content. -->
<!-- The link is to the recruit page on surveyor NPD's site.
    -->
<!-- The image is dynamically created by surveyor NPD's
    sampling program. -->
<!-- If this visit is the Nth visit, then a large banner graphic
    will be visible, -->
<!-- otherwise, a very small transparent image that will
    not be noticed is displayed.-->
<center>
<a href="http://mis.npd.com/web/NthTest/recruit.html">
<IMG SRC="http://mis.npd.com/cgi-bin/execute?Nth/
    nph-count?JOB=J4J4X01-1 border=0>
</a><br>
</center>
<!-- End of modification to Advertiser's page -->
<img scr="images/vpeint01.jpg"border=0>
<br>
<table>
<tr>
<td><ahref="access.html"><h3 >AccessDatabase</
    h3></a>
</table>
<img scr="images/bar.jpg"align="center">
<p><em>Copyright © 1996 The NPD Group, Inc.
</center></em>
</body>
</html>
```

According to an alternative embodiment, the survey system may be implemented in a general purpose computer system which operates as a terminal accessed by one or more individuals. The invention is not limited to implementation in a networked system or using Internet protocols. A user terminal such as a kiosk may be provided. The primary function of the terminal or kiosk need not be limited to advertising. The primary function may be an ordering system for goods such as a catalog ordering terminal or other terminal provided for user transactions. Another example of a user transaction terminal would be a motor vehicle transaction terminal, i.e., for renewal of driver licenses or vehicle registrations. The system according to the invention may be useful where the administrator of the transactional terminal would like to survey terminal or transaction system users. Users of the terminal may be offered the opportunity to complete a survey based on selection criteria. Preferably, the offer to participate is made at the conclusion of the transaction. The selection criteria may be any predetermined criteria or random or statistically driven pseudo-random criteria. If a user is selected to participate, the user may be presented with various information intended to entice his participation. The user may then be presented with a survey questionnaire to be completed interactively. The operating software for the selection and the survey may be located within the user terminal or, if the terminal is part of a network, the survey software may be located remotely from one or more of the terminals.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent apparatus, articles, and methods. The claims below are set forth to define the scope of the invention.

I claim:

1. A method for conducting a survey of users of an information document site located on a computer network, comprising the steps of:

embedding computer program instructions into an information document located at an information document site, wherein the instructions invoke a survey program;

receiving requests for the information document from a plurality of users;

selecting survey candidates from the plurality of users by using a predetermined offering criterion;

transmitting the information document to the plurality of users who are not survey candidates;

offering survey candidates an opportunity to participate in a survey;

transmitting the information document to survey candidates who decline the opportunity;

transmitting a survey document to survey candidates who accept the opportunity; and transmitting the information document to survey candidates who answer the survey document.

2. The method of claim 1, further comprising the step of:

offering the participant an inducement to accept the opportunity.

3. The method of claim 2, further comprising the step of:

allowing a participant that is not induced access to the information document.

4. The method of claim 2, wherein:

the inducement is a reward.

5. The method of claim 4, further comprising the step of:

recording information about the participant for delivery of the reward upon completion of the survey.

6. The method of claim 2, wherein:

the inducement is a request for assistance.

7. The method of claim 1, wherein:

the offering criterion is based upon a random method.

8. The method of claim 1, wherein:
the offering criterion is based upon a systematic method.
9. The method of claim 1, wherein:
the computer network is an open global network.
10. The method of claim 9, wherein:
the information document is a world wide Web page.
11. The method of claim 10, wherein:
the Web page is in HTML format.
12. The method of claim 1, wherein:
the survey program is located on the computer network remote from the site.
13. A method for conducting a survey of users of an information document site located on a computer, comprising the steps of:

embedding computer program instructions into an information document located in a computer, wherein the instructions invoke a survey program;

receiving requests for the information document from a plurality of users;

selecting survey candidates from the plurality of users by using a predetermined offering criterion;

presenting the information document to the plurality of users who are not survey candidates;

offering survey candidates an opportunity to participate in a survey;

presenting the information document to survey candidates who decline the opportunity;

presenting a survey document to survey candidates who accept the opportunity; and presenting the information document to survey candidates who answer the survey document.

14. A method for conducting a survey of users of an information document site located on a computer, comprising the steps of:

receiving requests for the information document from a plurality of users;

selecting survey candidates from the plurality of users by using a predetermined offering criterion;

presenting the information document to the plurality of users who are not survey candidates;

offering survey candidates an opportunity to participate in a survey;

presenting the information document to survey candidates who decline the opportunity;

presenting a survey document to survey candidates who accept the opportunity; and presenting the information document to survey candidates who answer the survey document.

15. A system for conducting a survey of users of an information document site located on a computer network, comprising:

computer program instructions embedded into an information document located at the site;

a survey program that is invoked by the instructions and launched when a user accesses the information document over the computer network;

an offering criterion within the survey program for selectively denoting a user as a survey candidate;

a survey opportunity document for transmission to the survey candidate;

a survey document; and a decision program for transmitting the survey document only to a survey candidate that responds positively to the survey opportunity document.

\* \* \* \* \*